United States Patent [19]
Allen et al.

[11] Patent Number: 5,610,719
[45] Date of Patent: Mar. 11, 1997

[54] DISPLACEMENT DETECTION SYSTEM

[75] Inventors: Nicholas Allen, Bedford; Abdu Broudour, West Newton; Sergey Broude, Newton Centre; Eric Chase, Carlisle; Carl Johnson, Tewksbury; Pascal Miller, North Chelmsford; Jay Ormsby, Salem; Arkady Savikovsky, Brookline, all of Mass.

[73] Assignee: QC Optics, Inc., Burlington, Mass.

[21] Appl. No.: 500,433

[22] Filed: Jul. 10, 1995

[51] Int. Cl.$^6$ .................................................. G01B 11/00
[52] U.S. Cl. .................. 356/374; 250/201.4; 250/237 G; 250/559.29
[58] Field of Search .................................... 356/373, 374; 250/201.2, 201.4, 201.5, 237 G, 559.22, 559.29, 559.31, 559.38

[56] References Cited

U.S. PATENT DOCUMENTS 3,858,981  1/1975  Jaerisch et al. ................. 250/237 G
4,009,386  2/1977  Deml et al. ........................ 250/201.4

FOREIGN PATENT DOCUMENTS

WO90/12280  10/1990  WIPO ................................... 356/374

Primary Examiner—F. L. Evans
Attorney, Agent, or Firm—Iandiorio & Teska

[57] ABSTRACT

A system for detecting displacement of a surface in a direction normal to the surface, the system including a first grating; a second grating; an optical subsystem for projecting an image of the first grating onto the surface and for directing a secondary image of the first grating reflected off the surface onto the second grating; and a detector, responsive to the fringe pattern formed after the secondary image passes through the second grating, for detecting displacement of the surface in a direction normal to the surface.

19 Claims, 8 Drawing Sheets

DISPLACEMENT DETECTION SYSTEM

FIELD OF INVENTION

A displacement detection system utilizing a moire fringe technique for a surface having areas of different reflectivity which automatically detects any displacement of the surface in a direction normal to the surface and which can be incorporated within a feedback loop to adjust the position of the surface upon the detection of any displacement.

BACKGROUND OF INVENTION

There is often a need to maintain the focus of a laser beam on a surface. One example lies in the inspection of a photolithographic masks. These masks have a chrome pattern on a glass or quartz substrate and are used in the manufacture of thousands of semi-conductor wafers during a production run in a "stepper" printing machine. Therefore, it is critical that the surface of the mask be free of contaminating particles lest the images of the particles show up on the wafers causing defects. Accordingly, the masks are typically inspected using very precise equipment shown, for example, in U.S. Pat. Nos. 4,943,734; 4,794,264; 4,794,265; and 5,389,794 incorporated herein by reference.

As a mechanical mask holder/spindle assembly spins the mask, the surface of the mask is illuminated by a laser beam directed to the surface and the scattering of the laser beam from the surface is analyzed: the scattering by the surface is different if a flaw or particle is present than if no particle or flaw is present. In fact, the scattering is indicative of the size of a detected particle flow. In order to scan for and detect very small particles (e.g., 0.3 microns in diameter), on a patterned plate, it is very important that the laser beam be focused to form a very small spot size. For a small diffraction-limited spot size, the depth of focus is very small. Therefore, the distance from the means which focuses the laser beam to the surface must be kept constant. Since the mask may be warped and/or since the mechanical mask holder/spindle assembly may cause displacement of the mask with respect to the parabolic mirror, however, the laser beam may become defocused on the mask surface. When it does, it will not be able to detect small particles on the surface of the mask. Accordingly, any displacement of the mask must be detected and the distance from the parabolic mirror to the mask adjusted to keep the laser beam in focus at all times as the mask rotates.

There are a few prior art techniques for detecting deflection of a surface in a direction normal to the surface. The beam deflection technique detects movement of a laser beam after it is deflected by the surface. Movement of the beam after it is reflected from the surface is indicative of surface displacement. The problem with the beam deflection technique, however, is that it is sensitive to the angle of the surface. Therefore, it cannot be used in conjunction with warped photolithographic masks. Another technique is called the "triangulation". See "Optical Techniques for Industrial Inspection", P. Cielo, Academic Press; 1988. Although this technique overcomes the surface angle sensitivity problem of the beam deflection technique, triangulation can not be used on surfaces having areas of differing reflectivity such as a photolithographic mask which has chrome areas (high reflectivity) and glass areas (low reflectivity). A third technique is the knife edge technique also known as the Foucault technique. In this technique a small focused spot is imaged onto a knife edge, and a detector, usually a bicell, is placed behind the knife edge. This technique is also sensitive to a chrome on glass pattern, for example, when a chrome edge crosses the focused light spot. A fourth technique, called image processing, involves the observation of the sharpness or focus of the chrome/glass pattern image on a detector. If the image of the pattern goes out of focus, the surface must have moved with respect to the detector. The problem with the image processing technique, however, is that it depends on a pattern always being in view of the image processor. This may not always be possible since some photolithographic masks are not patterned in all areas of the mask.

SUMMARY OF INVENTION

It is therefore an object of this invention to provide a system for detecting displacement of a surface in a direction normal to the surface.

It is a further object of this invention to provide such a system which is insensitive to the angle of the surface and therefore can detect the amount of warpage in a photolithographic mask or similar surface.

It is a further object of this invention to provide such a system which is insensitive to areas of differing reflectivity and transitions between these areas on the surface and can therefore be used in conjunction with a photolithographic mask having a chrome pattern on a glass substrate.

It is a further object of this invention to provide such a system which detects displacement of the surface independent of whether a pattern is present on the surface.

It is a further object of this invention to provide such a system which can be used as a component of a laser beam focusing apparatus to maintain the focus of a laser beam on the a surface even if the surface is warped or the surface is displaced in a direction normal to the surface.

It is a further object of this invention to provide such a system which can be used with a number of different types of detectors and a number of different types of surfaces and which can be implemented with two or even just one binary, gray scale, or phase grating.

This invention results from the realization that the displacement of a surface in a direction normal to the surface can be accurately and quickly detected by observing the shift of a fringe pattern formed after the secondary image of one grating reflected from the surface is passed through another grating and further that such a technique yields accurate results even if the surface is at an angle and regardless of whether the surface has a pattern.

This invention results from the further realization that this technique accurately detect the displacement of a surface having different areas of reflectivity (e.g. a chrome/glass pattern on a photolithographic mask) if the secondary image is defocused in a direction perpendicular to the direction to the rulings of the secondary image so that the fringe pattern does not erroneously appear to shift due to the secondary image striking areas of differing reflectivity which would otherwise cause displacement reading errors.

This invention features and may, depending on the specific implementation, comprise, include, consist essentially of, or consist of a system for detecting displacement of a surface in a direction normal to the surface. In one embodiment, the system includes a first grating, a second grating, means for projecting an image of the first grating on the surface; means for directing a secondary image of the first grating reflected off the surface onto the second grating; and detector means, responsive to the fringe pattern formed after the secondary image of the first grating reflected off the surface passes through the second grating, for detecting displacement of the surface in a direction normal to the surface.

The first and second gratings are typically Ronchi rulings. The means for projecting is an objective lens positioned in an optical path between the first grating and the surface and between the surface and the second grating.

The second grating may be orientated with its rulings parallel to the rulings of the secondary image of the first grating reflected of the surface. In this embodiment, the detector means includes a photosensor providing a signal indicative of the intensity of light passing through the second grating. For accuracy when the surface under inspection has areas of differing reflectivity, the invention further includes means for sensing the reflectivity of the surface from which the image of the first grating is reflected and for adjusting the detector means to be insensitive to areas of differing reflectivity on the surface.

In another embodiment, the second grating is orientated with its rulings at an angle with respect to the rulings of the secondary image of the first grating reflected off the surface creating a moire fringe pattern. In this embodiment, the detector means is a CCD camera for detecting shifts of the fringes of the moire fringe pattern. Alternatively the detector means includes at least two sets of photosensors, each sensor of one set aligned with a dark fringe of the moire fringe pattern, and each sensor of second set aligned with a bright fringe of the moire fringe pattern for detecting shifts of the fringes of the moire fringe pattern.

For accuracy, when the surface under inspection has areas of differing reflectivity, the system further includes anamorphic means for defocusing the secondary image of the first grating in a direction parallel to the direction of the rulings of the secondary image of the first grating to blur any distinction in reflectivity of the surface while preserving the secondary image parallel to the direction of the rulings. The anamorphic means may include a first cylindrical lens orientated with its cylindrical axis perpendicular to the direction of the rulings of the secondary image of the first grating. A second cylindrical lens may be positioned in an optical path behind the second grating for concentrating more light onto the detector means for increased sensitivity. The second cylindrical lens is orientated with its cylindrical axis perpendicular to the direction of the fringes of the fringe pattern.

The first and second gratings may be integral as well as physically separate. Therefore, this invention features a system for detecting displacement of a surface in a direction normal to the surface, the system comprising at least one grating; means for projecting an image of the grating onto the surface; means, responsive to a secondary image of the grating reflected off the surface for creating a fringe pattern; and detector means, responsive to the fringe pattern, for detecting displacement of the surface in a direction normal to the surface. If there is only one grating, the means for creating a fringe pattern includes mean for directing the secondary image back through that grating. If there are two gratings, the means for creating a fringe pattern includes means for directing the secondary image onto the second grating. The rulings of the second grating may be aligned parallel to the rulings of the secondary image or orientated at an angle with respect to the rulings of the secondary image for creating a moire fringe pattern.

DISCLOSURE OF PREFERRED EMBODIMENT

Other objects, features and advantages will occur to those skilled in the art from the following description of a preferred embodiment and the accompanying drawings, in which.

Figure 1:
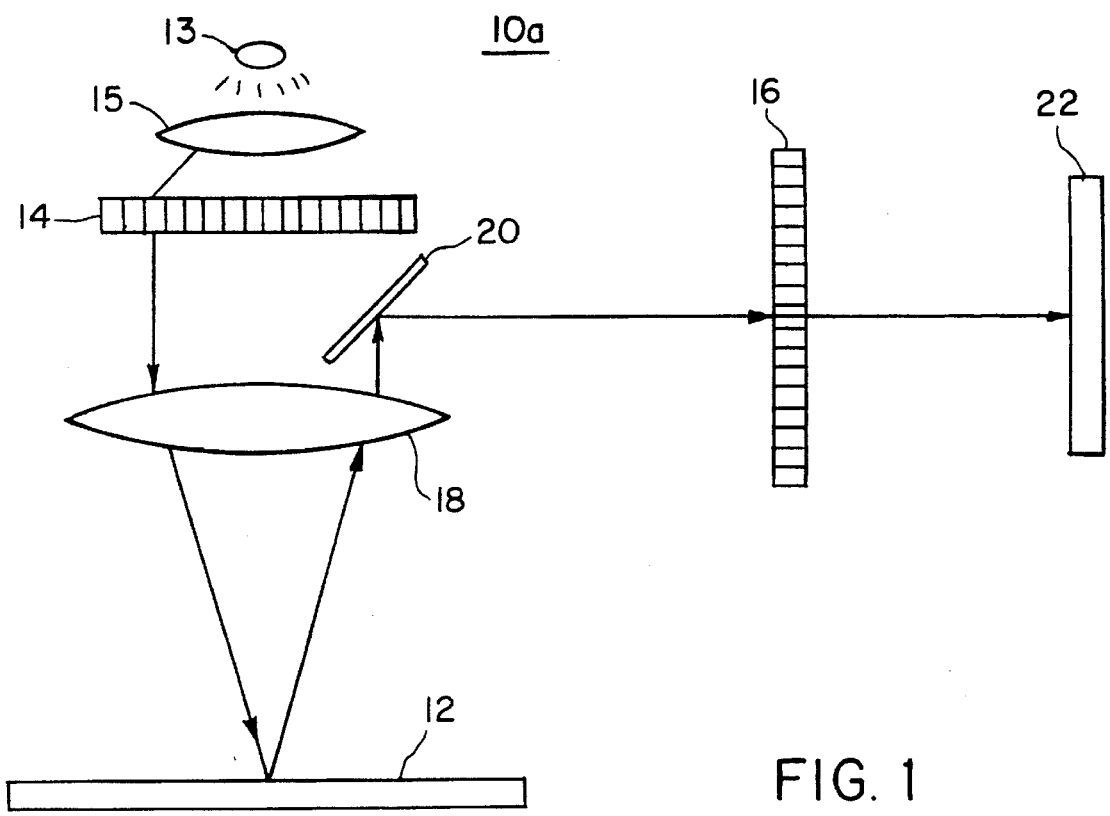
FIG. 1 is a schematic view of the optical system for detecting displacement of a surface in a direction normal to the surface according to this invention.

System 10a, FIG. 1, for detecting displacement of a surface 12 in a direction normal to the surface includes first grating 14 and second grating 16. Light from source 13 passes through lens 15 and grating 14. There are means such as one half of the pupil of objective lens 18 for projecting an image about 0.5×1 mm of first grating 14 onto surface 12. The other half of the pupil of objective lens 18 and mirror 20 direct the secondary image of the first grating (reflected from the surface) onto second grating 16. This forms a fringe pattern after the secondary image of the first grating passes through the second grating. The fringe pattern is monitored by detector 22 to detect displacement of surface 12 in a direction normal to the surface.

Figure 2:
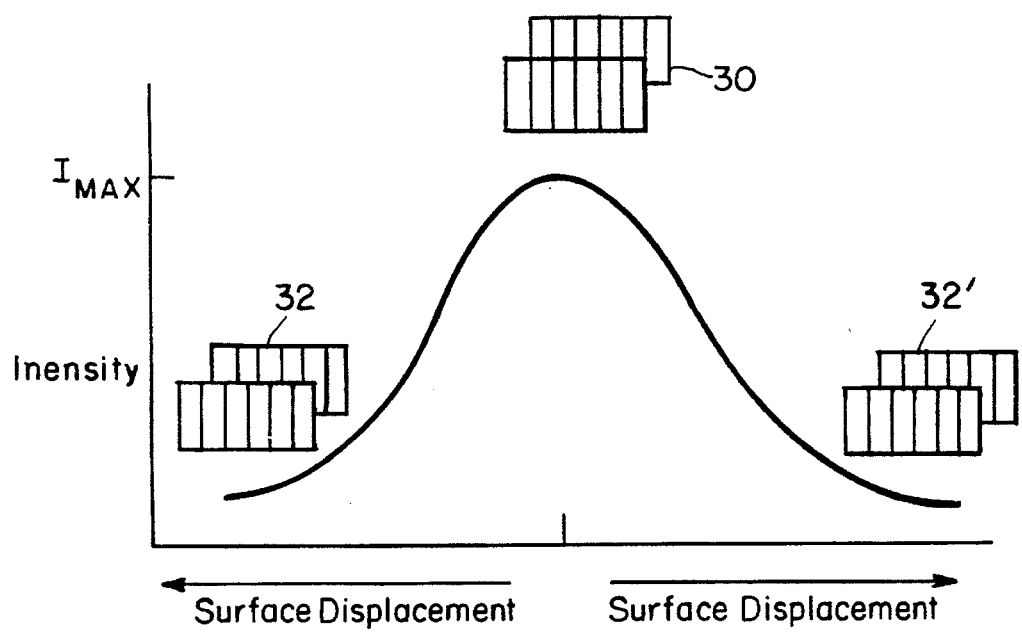
FIG. 2 is a graph depicting the change in intensity of the fringe pattern caused by the two gratings shown in FIG. 1 which is indicative of displacement of the surface.

In a preferred embodiment, first and second gratings 14 and 16 are both Ronchi rulings (300 lines per inch). In one embodiment, grating 16 is orientated with its rulings parallel to the rulings of the secondary image of the first grating after it is reflected from surface 12. In this way, as shown in FIG. 2, the intensity of the light passing through second grating 16, FIG. 1 will vary as surface 12 moves in a direction normal to the surface. In one position of the surface as shown at 30, the rulings of both gratings are aligned allowing the maximum intensity of light to be passed through the second grating. At the other extreme position of the surface as shown at 32 and also at 32', the rulings of one grating are completely offset with respect to the rulings of the other grating and the minimal amount of light is seen by detector 22, FIG. 1.

As surface 12 moves, the rulings of the secondary image reflected off the surface shift with respect to the rulings of grating 16. The resulting intensity, FIG. 2, is then a function of the amount of surface displacement. Detector 22 can be a photosensor which provides a signal indicative of the intensity of light passing through the second grating. The intensity of light passing through the second grating is a function of the displacement of the surface in a direction normal to the surface. The intensity of light detected by the photosensor is then sent to a signal processor to calculate the amount of displacement of the surface and the signal processor can then in turn provide a feed back signal used to adjust the surface to account for any displacement. A typical feedback loop is described infra with respect to FIG. 13.

Figure 3:
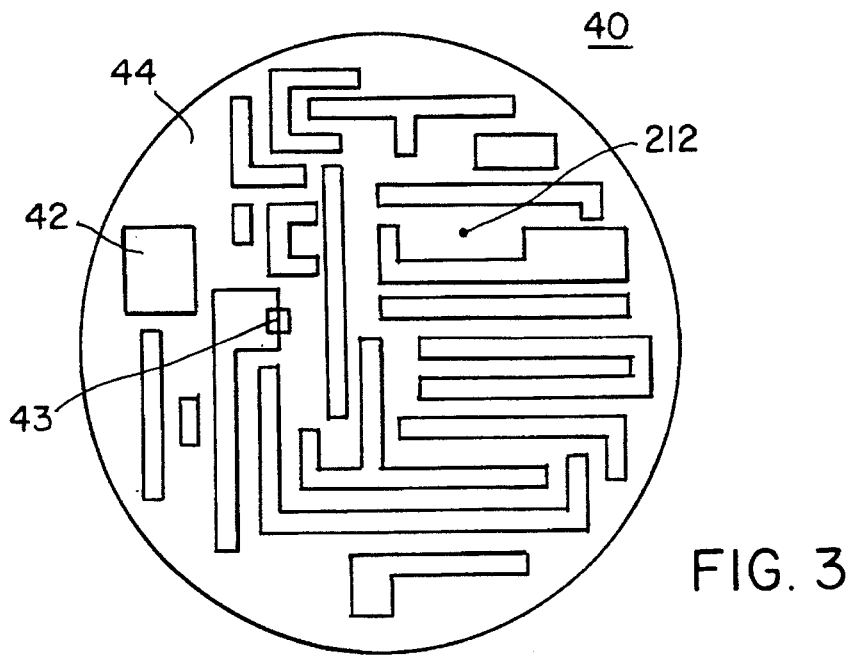
FIG. 3 is a top plan view of a typical patterned surface such as a photolithographic mask.

As discussed in the Background of Invention above, there is a need to maintain the focus of a laser beam on the surface of photolithographic mask 40, FIG. 3 which has a pattern of chrome lines on a glass substrate as shown. System 10a, FIG. 1, must be slightly modified if surface 12 is photolithographic mask such as mask 40 because the maximum intensity $I_{max}$ of light as shown at 30 in FIG. 2 is different if the image of the first grating is reflected from chrome area 42, FIG. 3 (high reflectivity), than if it is reflected off glass area 44 (low reflectivity). Without a modification to system 10a, FIG. 1, a photosensor would detect a change in intensity based, not only on displacement of the surface, but also on variations in reflectivity of the surface as the image of the first grating moves from chrome to glass to chrome, etc. This would result in displacement reading errors.

Figure 4:
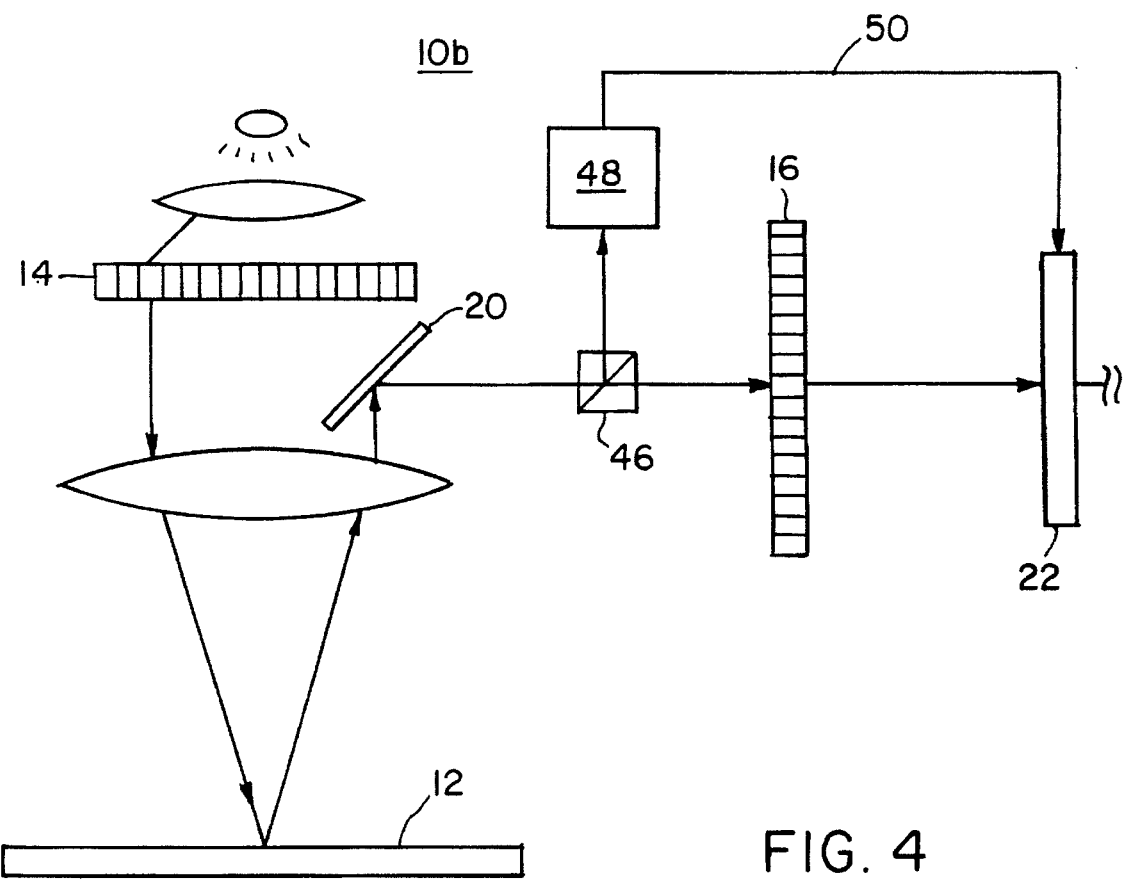
FIG. 4 is a schematic view of another embodiment of the optical system shown in FIG. 1 when the surface has areas of different reflectivity such as the patterned surface shown in FIG. 3.

Accordingly, in system 10b, FIG. 4, beam splitter 46 directs the pattern of the first grating 14 also to sensor 48 which measures the reflectivity of surface 12 over the entire field of view and sends a normalizing signal over line 50 to detector 22 to account for areas of differing reflectivity of the surface. Sensor 48 can be a photodetector (e.g. a photodiode or a photomultiplier) responsive to the total intensity of light reflected from the surface. This type of a detector in conjunction with the stable and calibrated light source, permits surface reflectivity to be calculated to normalize signal from the detector 22.

Figure 5:
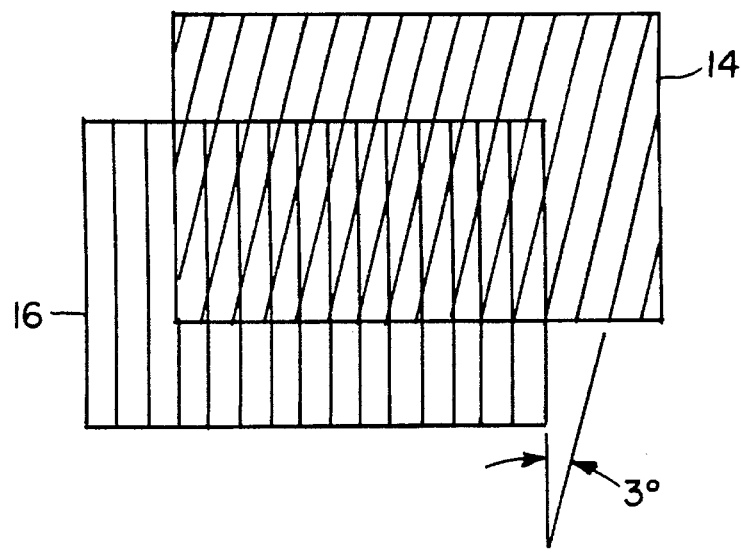
FIG. 5 is a front view of the first grating angled with respect to the second grating to create a moire fringe pattern in still another embodiment of the system shown in FIG. 1.
Figure 6:
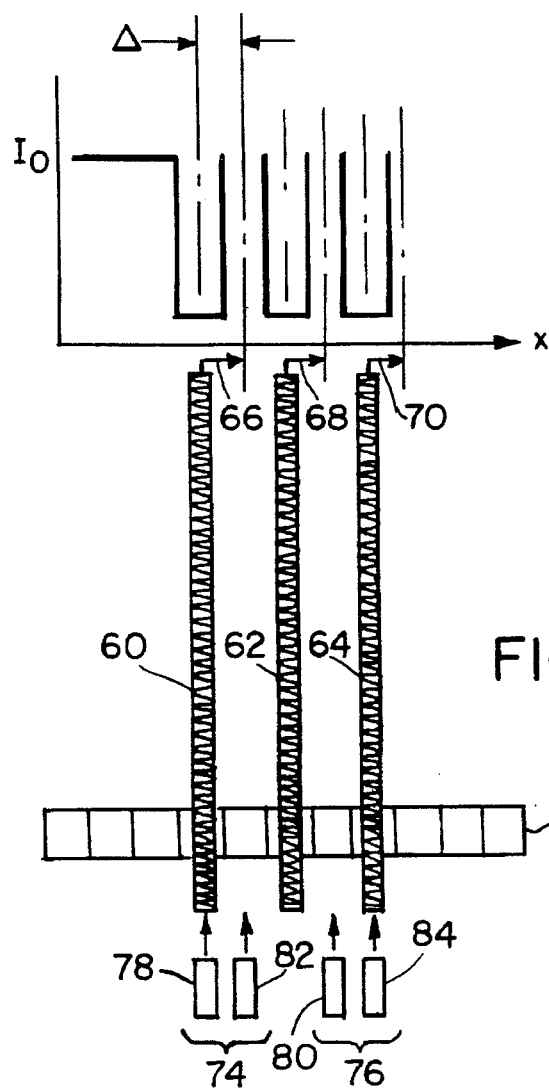
FIG. 6 is a schematic view showing two different types of detectors which may be used in conjunction with the system shown in FIG. 5 when the gratings are angled as shown in FIG. 5.

In the embodiments shown in FIGS. 1 and FIGS. 4, second grating 16 is orientated with its rulings parallel to the rulings of the image of the first grating reflected off the surface. If, instead, as shown in FIG. 5, the second grating is orientated with its rulings at an angle (e.g. 3°) with respect to the rulings of the image of the first grating reflected off the surface, a moire fringe pattern is created after the image of the first grating passes through the second grating. The positions of moire fringes depend on gratings' spacings and on the angle between rulings of first and second gratings. Three of the dark fringes of the resulting moire fringe pattern, 60, 62, and 64 are shown in FIG. 6. A shift of these fringes as shown at 66, 68 and 70 is indicative of the displacement of surface 12. Detector 22, FIG. 1, is now a CCD camera 72 aligned to detect any shift of fringes 60, 62, 64 of the moire fringe pattern and to provide a signal indicative of the displacement of the surface in a direction normal to the surface. Alternatively, detector 22, FIG. 1, may include two sets of photosensors 74 and 76, FIG. 6, each sensor 78 and 80 of one set aligned with the dark fringes 60 and 64, respectively, and each sensor 82 and 84 of the second set aligned with bright fringes of the moire fringe pattern. In this way, when the dark fringes shift as shown at 66, 68 and 70, this will be detected by two sets of photosensors 74 and 76.

Figure 7A:
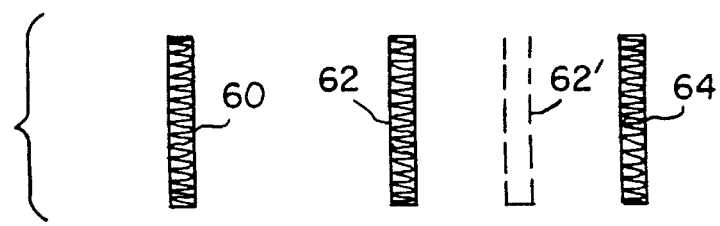
FIGS. 7A–7D are graphs showing the effect of the patterned surface shown in FIG. 3 on the system shown in FIG. 1 when the gratings are angled as shown in FIG. 5.
Figure 7B:
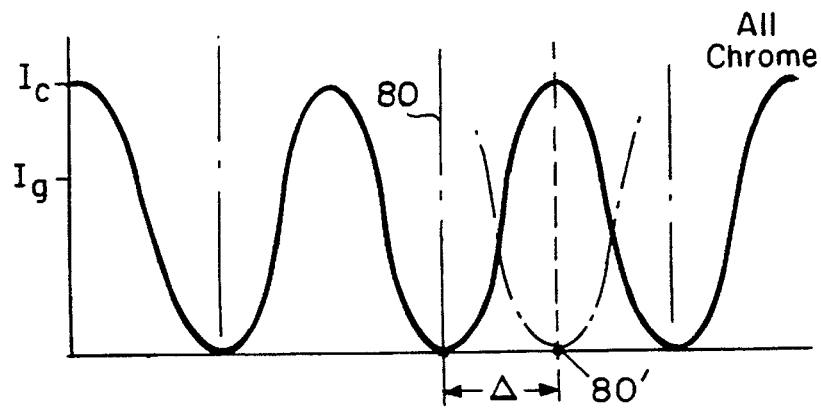
Figure 7C:
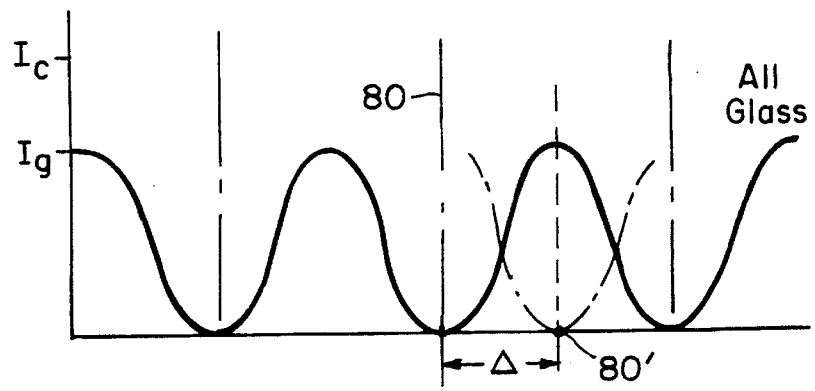
Figure 7D:
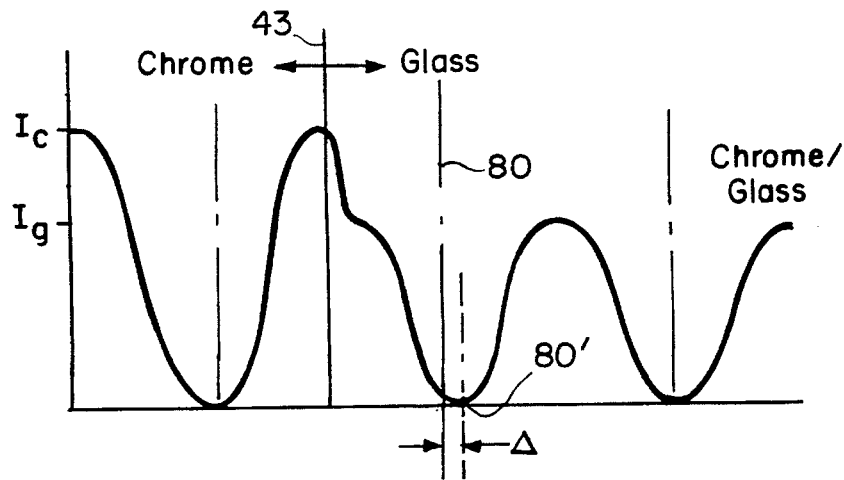

If surface 12, FIG. 1, is a patterned photolithographic mask 40 as shown in FIG. 3, then the embodiment 10a shown in FIG. 11a must again be slightly modified in the case where a moire fringe pattern is used to indicate displacement of the surface. FIG. 7A depicts the same dark fringes 60, 62, and 64 as shown in FIG. 6. The intensity of light detected by CCD camera 72, FIG. 6 is shown in FIG. 7B when the secondary image of the first grating is reflected from all chrome; FIG. 7C when the secondary image of the first grating is reflected from all glass; and FIG. 7D when the secondary image of the first grating is reflected off a chrome/glass interface as shown at 43, FIG. 3. CCD camera 72, FIG. 6 is used to monitor the center of dark fringe 62 as shown at 80, and the center of light intensity distribution within shifted dark fringe 62' as shown at 80'. The distance between these two center points is indicative of the amount of displacement of surface 12, FIG. 1. As long as surface 12 is of a fairly constant reflectivity, such as all chrome (FIG. 7B), or all glass (FIG. 7C), this scheme works well. There are times, however, when the image of the first grating will strike a chrome/glass interface 43, FIG. 3 when the rulings of the secondary image are perpendicular to chrome/glass interface 43. When this occurs, as shown in FIG. 7D, the center of light intensity distribution within dark fringe 62 as shown at 80 is actually shifted to 80' even though the surface did not move. In other words, the differing reflectivity of the surface shifted the fringe pattern resulting in a false indication of surface deflection.

Figure 8:
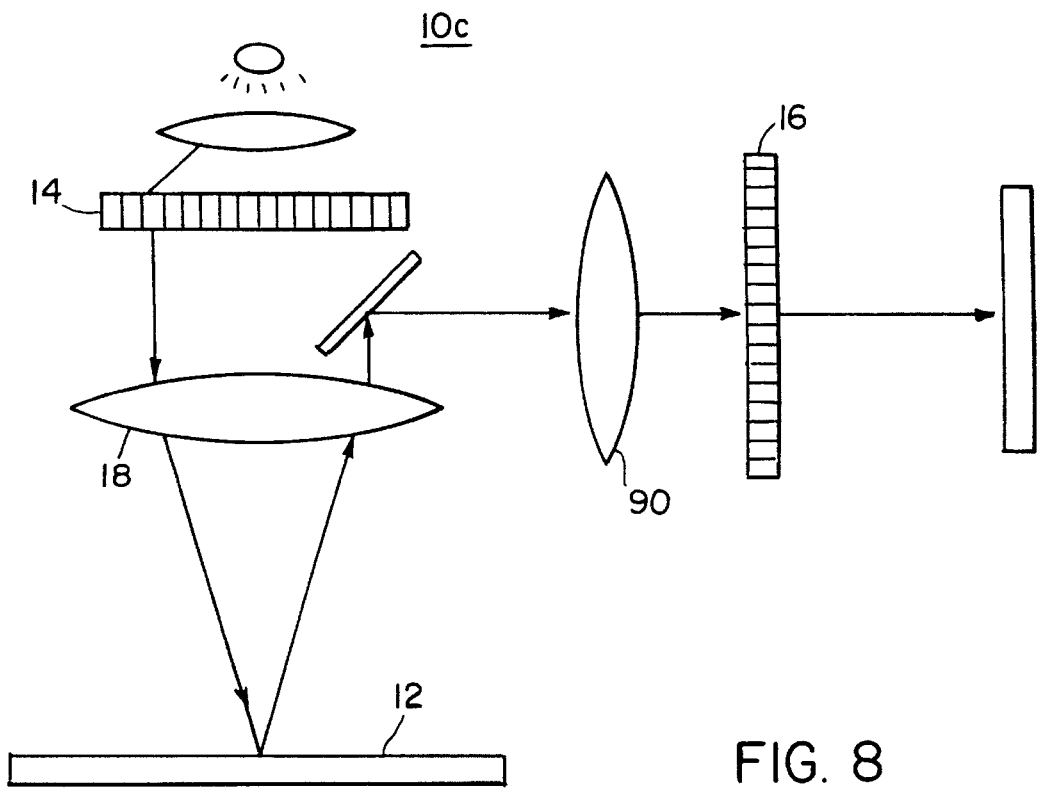
FIG. 8 is a schematic view of another embodiment of the optical system shown in FIG. 1 which compensates for the effect of the chrome/glass pattern shown in FIG. 7D.

To overcome this source of potential error, the invention features system 10c, FIG. 8. Anamorphic means such as cylindrical lens 90 defocuses the secondary image of grating 14 reflected off surface 12 in a direction parallel to the direction of the rulings of the secondary image to blur the distinction in reflectivity of the surface while still preserving the focus of the secondary image in a direction perpendicular to the direction of the rulings. Blurring the image 43, FIG. 9A of the first grating reflected off the surface in a direction parallel to the rulings as shown at 94, FIG. 9B, eliminates the sharp contrast in reflectivity due to chrome/glass interface 43. A cylindrical lens blurs the image in that direction and maintains the sharpness of the image in the direction perpendicular to the rulings so the moire fringe pattern is not affected. Cylindrical lens 90 is positioned in an optical path between surface 12 and second grating 16 and is orientated with its cylindrical axis perpendicular to the direction of the rulings of the image of first grating 14 reflected off surface 12.

Figure 9A:
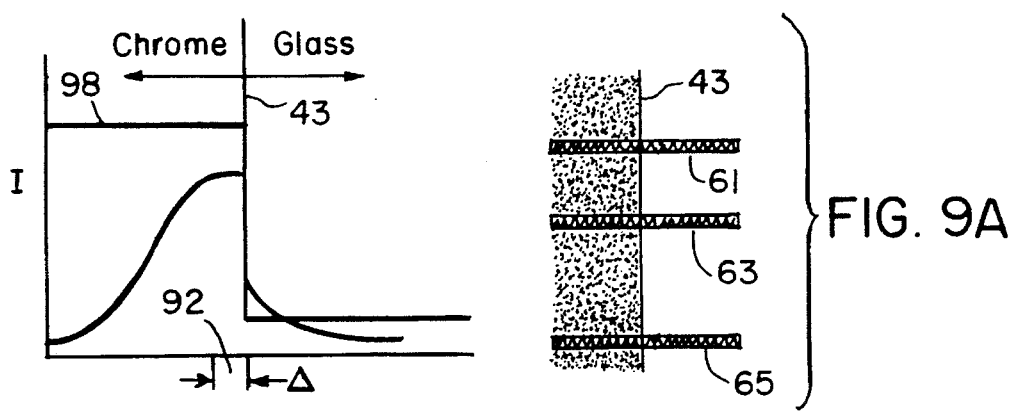
FIGS. 9A–9B are graphs showing how the system shown in FIG. 8 compensates for any errors associated with detecting displacement of a surface in a direction normal to the surface when the surface is a photolithographic mask or any surface having a pattern.

As shown, in FIG. 9A as the image 45, FIG. 3, of the first grating strikes an interface 43 between chrome and glass on patterned surface 40, the intensity of the reflected light has a sharp contrast 43, FIG. 9A and the center of ruling 63 of the secondary image is shifted by an amount Δ as shown at 92. This results in an erroneous reading of apparent surface deflection.

Figure 9B:
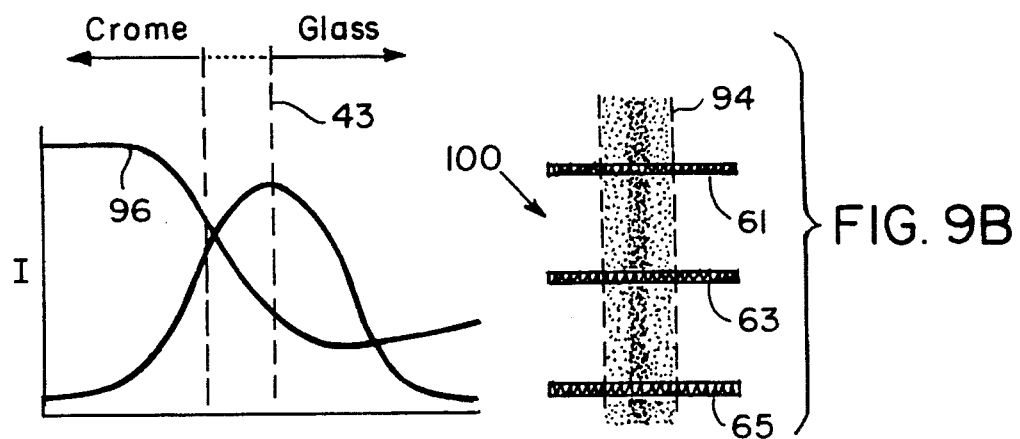

Cylindrical lens 90, FIG. 8, however, blurs the chrome/glass interface 43 as shown at 94, FIG. 9B, resulting in an intensity distribution as shown at 96 which is smoother than the sharp contrast in intensity as shown at 98, FIG. 9A. Therefore, the interface 43 does not affect the intensity of light of the secondary image reflected off the surface. Lens 90, FIG. 8, defocuses this secondary image 100, FIG. 9B, in a direction parallel to the direction of rulings 61, 63, 65 to blur any distinction as shown at interface 43 in FIG. 9A in reflectivity of the surface while preserving the secondary image in the direction perpendicular to the direction of the rulings to maintain the sharpness of the moire fringe pattern.

Cylindrical lens 90, FIG. 8 has a very short focal distance to spread the secondary image as wide as possible and enough of an aperture to intercept the entire beam reflected back through the second half of objective lens 18. Lens 90 may be a negative lens with a focal length of −20 mm, 20 mm wide.

Figure 10:
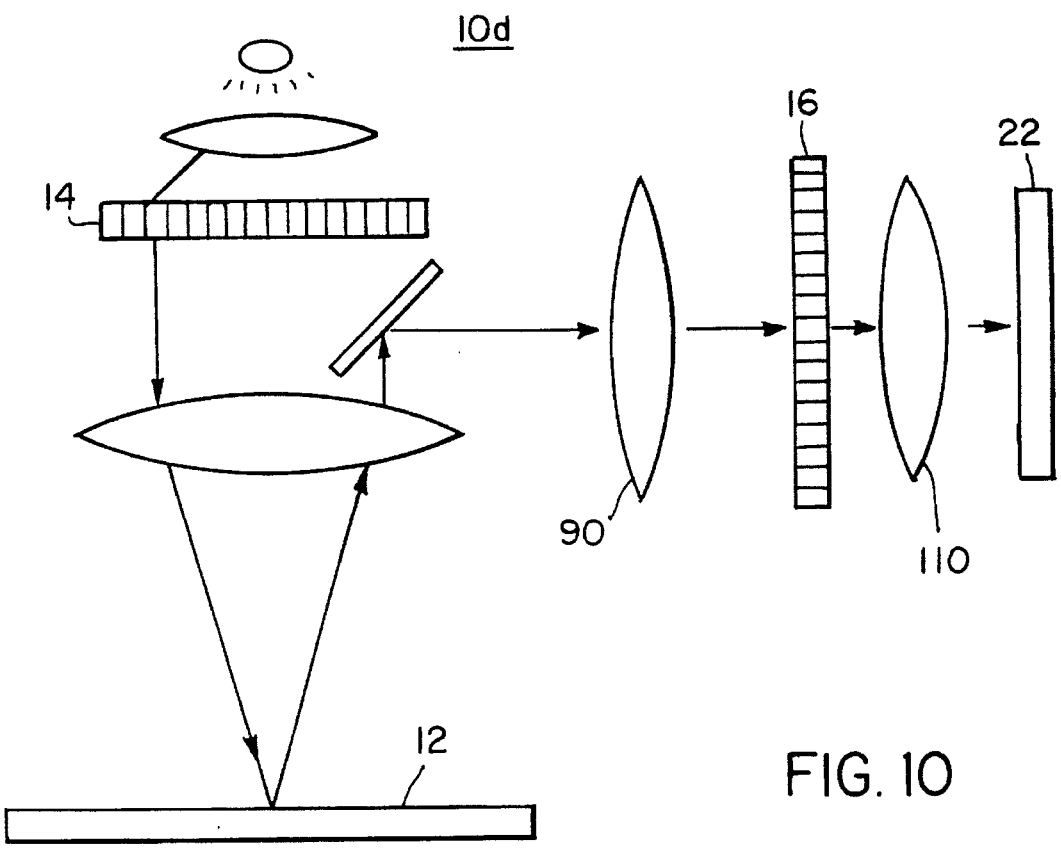
FIG. 10 is a schematic view of still another embodiment of the optical system shown in FIG. 1.
Figure 11A:
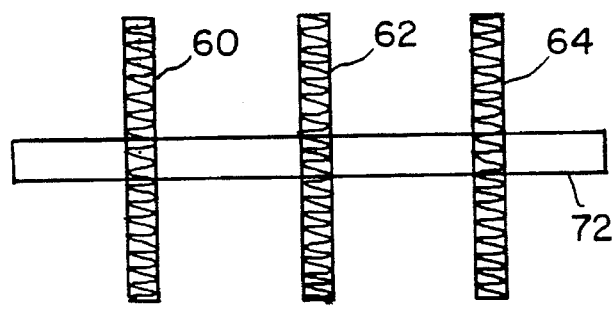
FIGS. 11A–11B are schematic views showing the effect of the second cylindrical lens shown in FIG. 10 for concentrating more light on the detector used in conjunction with this invention.
Figure 11B:
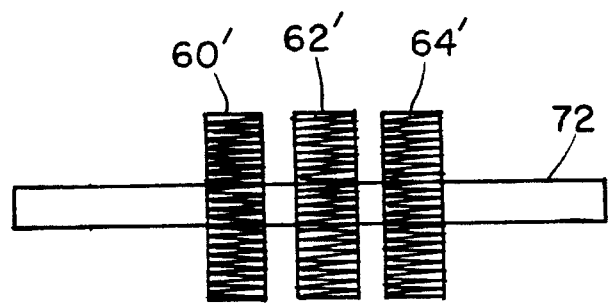

In the embodiment shown in FIG. 10, another cylindrical lens 110 is positioned in an optical path behind second grating 16 to concentrate more light onto detector 22. Cylindrical lens 110 is orientated with its cylindrical axis perpendicular to the direction of the fringes in the fringe pattern and has a short focal distance and enough of an aperture to intercept the entire width of grating 16. Cylindrical lens 110 is placed as close as possible to the second grating 16 in order that detector 22 can also be placed close to second grating 16 so that the fringes are sharply visible e.g., a positive lens with a focal length of −22 mm, 22 mm wide. As shown in FIGS. 11A and 11B, lens 110 squashes fringes 60, 62, and 64 as shown in FIG. 11B to concentrate more light onto CCD camera 72.

Figure 12:
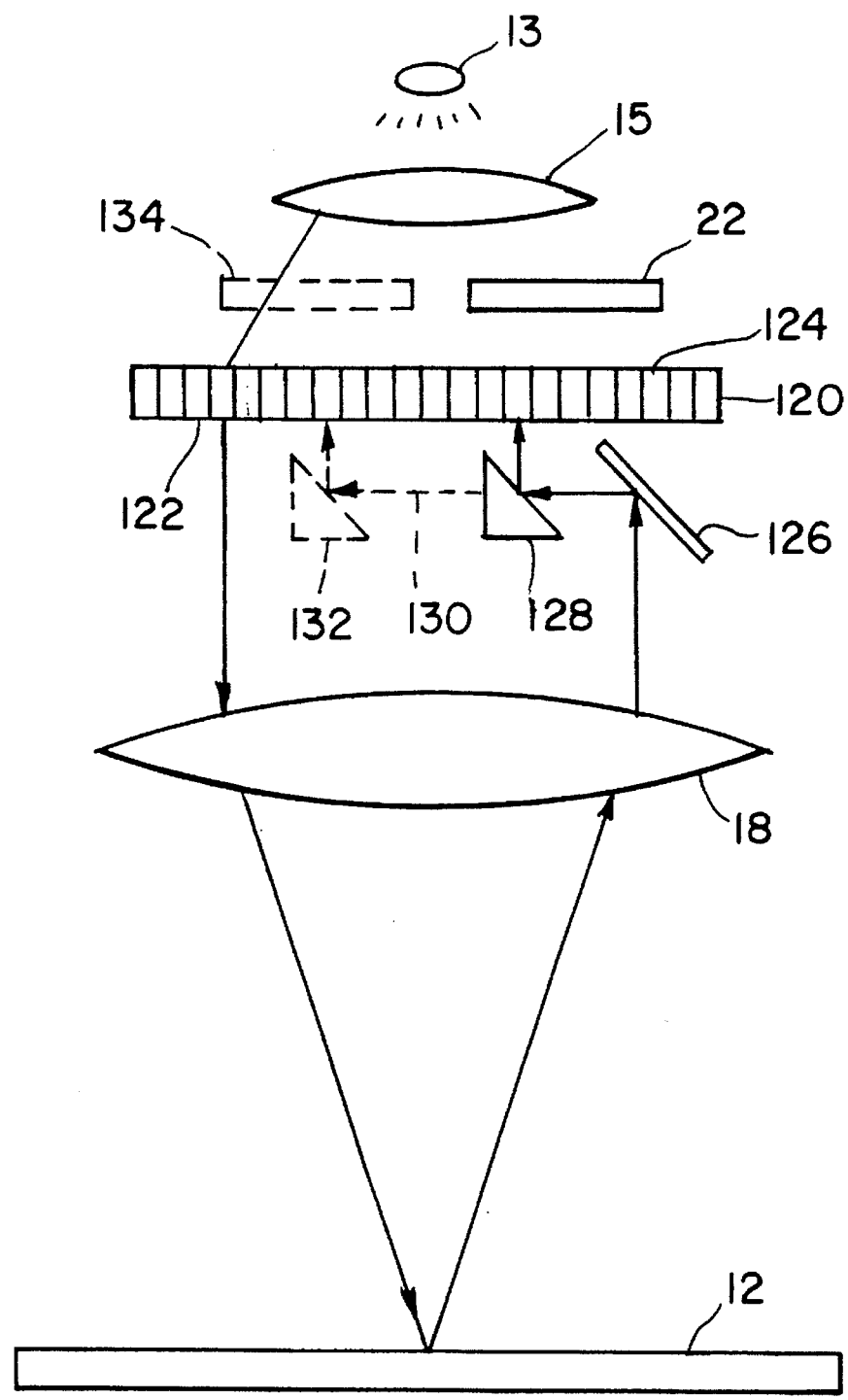
FIG. 12 is a schematic view of another embodiment of the system shown in FIG. 1 wherein only one grating is used to create a fringe pattern.

In another embodiment, the two gratings may be integral as shown for system 10e depicted in FIG. 12. Grating 120 has first grating portion 122 and second grating portion 124. Light from light source 13 passes through lens 15 and through portion 122 of grating 120 to be focused by objective lens 18 on surface 12. The secondary image of grating portion 122 is reflected back through objective lens 18 and directed by mirrors 126 and 128 to impinge on second portion 124 of grating 120. Detector 22 then operates in the way previously described.

Alternatively, as shown in phantom at 130, mirror 132 can direct a secondary image of the grating reflected off the surface back through the same portion of the grating and detector 134 is responsive to the image formed after the secondary image passes back through grating 120. This embodiment with only a single grating can be used in conjunction with the embodiments described with respect to FIGS. 1, 4, 8 and 10 and those skilled in the optical art will understand the various optical components required to redirect the secondary image of the grating reflected off the surface back to through the same grating portion to form a fringe pattern including a moire fringe pattern.

Figure 13:
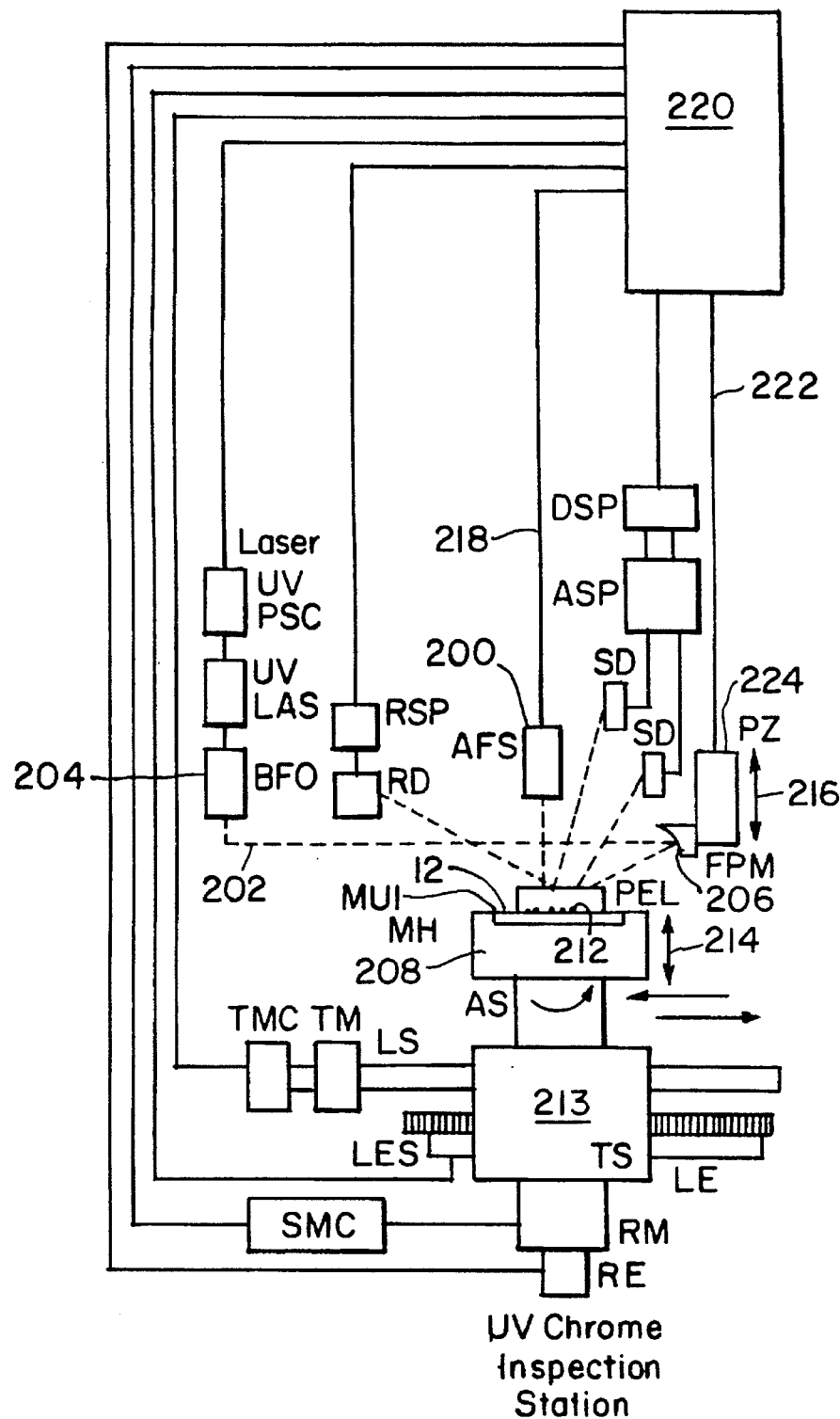
FIG. 13 is a block diagram of a system for automatically focusing a laser beam on a surface which incorporates the system shown in FIGS. 1, FIG. 4, 8, 10, or 12.

The embodiments shown in FIGS. 1, 4, 8, 10 and 12 are useful when incorporated as an automatic focusing sensor 200, FIG. 13, to automatically focus laser beam 202 from beam forming optics 204 on the surface 12 by means of parabolic mirror 206 or by other focusing means. Spindle assembly 208 provides relative motion between surface 12 and laser beam 202 and may be used in conjunction with translation stage 213 to form a spiral inspection pattern on the surface of photolithographic mask 40, FIG. 3, to detect particles as small as 0.3 μm as shown at 212.

In order for accurate inspection to take place, laser beam 202, FIG. 13 must be tightly focused on surface 12. Surface 12, however, may be warped and/or mechanical assembly 208 could move in the direction shown by arrow 214. Accordingly, parabolic mirror 206 is adjusted up and down as shown by arrow 216 to account for any displacement on surface 12 in the direction shown by arrow 214. Sensor 200 provides a displacement signal on line 218 to signal processor 220 which in turn provides a mirror adjustment signal on line 222 to piezoelectric actuator 224 (available from Polytec PI Inc., Costa Mesa, Calif., as a Piezo Translator P845.20; Power Amplifier LVP-2: servocontroller E809.10) to drive mirror 206 in the direction shown by arrow 216. CCD camera 22 is exposed to the intensity distribution above of the fringe pattern shown in FIG. 11A. Camera 22 includes approximately 1000–2000 pixel elements, each collecting light falling on it and producing an output voltage proportional to intensity. These 1000 voltage values are sequentially read out, digitized, and stored in computer memory 201, FIG. 13 as an array. Then, a digital algorithm operating on processor 220 is used to process this array and to calculate the relative position of the fringe distribution with respect to camera sensor. Thus, any motion of the system of fringes will be converted into a number corresponding to the offset due to surface motion. Then, a linear scaling factor and a fixed offset is applied to this value, and D/A converter 221 develops a voltage to be applied to activator 224 to move parabolic mirror 206 in order to compensate for detecting fringe offset, i.e. surface defocus.

The system for detecting displacement of a surface in a direction normal to the surface as described herein, however, is not limited to such an inspection device as shown in FIG. 13 and there are other possible implementations for such a displacement detection apparatus including any environment wherein an accurate detection of surface displacement is required.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A system for detecting displacement of a surface in a direction normal to the surface, the system comprising;

a first grating;

a second grating;

means for projecting an image of the first grating onto the surface;

means for directing a secondary image of the first grating reflected off the surface onto the second grating;

detector means, responsive to the fringe pattern formed after said secondary image passes through said second grating, for detecting displacement of said surface in a direction normal to the surface; and means for sensing the reflectivity of the surface proximate the image of the first grating projected onto the surface and for adjusting said detector means to be insensitive to variations in reflectivity of the surface.

2. The system of claim 1 in which said first and second gratings are Ronchi rulings.

3. The system of claim 1 in which said means for projecting is an objective lens positioned in an optical path between said first grating and the surface and between the surface and said second grating.

4. The system of claim 1 in which said second grating is orientated with its rulings parallel to the rulings of the secondary image of the first grating reflected of the surface.

5. The system of claim 4 in which said detector means includes a photosensor providing a signal indicative of the intensity of light passing through said second grating.

6. The system of claim 1 in which said second grating is orientated with its rulings at an angle with respect to the rulings of said secondary image of the first grating reflected off the surface creating a moire fringe pattern.

7. The system of claim 6 in which said detector means is a CCD camera for detecting shifts of the fringes of said moire fringe pattern.

8. The system of claim 6 in which said detector means includes at least two sets of photosensors, each sensor of one set aligned with a dark fringe of said moire fringe pattern, and each sensor of the second set aligned with a bright fringe of said moire fringe pattern for detecting shifts of the fringes of said moire fringe pattern.

9. The system of claim 1 in which said first and second gratings are integral.

10. A system for detecting displacement of a surface in a direction normal to the surface, the system comprising:

a first grating;

means for reflecting an image of the first grating off the surface;

a second grating;

means for directing onto said second grating said image of the first grating reflected off the surface, said second grating being oriented with its rulings parallel to the rulings of said image of the first grating reflected off the surface;

means for detecting the amount of light passing through second grating and for providing a signal indicative of the intensity of light passing through second grating; and means for sensing the reflectivity of the surface proximate the image of the first grating reflected off the surface and for adjusting said means for detecting to be insensitive to variations in reflectivity of the surface.

11. A system for detecting displacement of a surface in a direction normal to the surface, the system comprising:

a first grating;

means for reflecting an image of the first grating off the surface;

a second grating;

means for directing said image onto said second grating, said second grating orientated with its rulings at an angle with respect to the rulings of the image creating a moire fringe pattern;

a cylindrical lens positioned in an optical path between the surface and said second grating, said cylindrical lens orientated with its cylindrical axis perpendicular to the rulings of said image; and detector means for detecting shifts of the fringes of said moire fringe pattern and for providing a signal indicative of the displacement of said surface in a direction normal to said surface.

12. A system for detecting displacement of a surface in a direction normal to the surface, the system comprising;

a first grating;

a second grating;

means for projecting an image of the first grating onto the surface;

means for directing a secondary image of the first grating reflected off the surface onto the second grating;

said second grating being orientated with its rulings at an angle with respect to the rulings of said secondary image of the first grating reflected off the surface creating a moire fringe pattern;

anamorphic means for defocusing said secondary image of the first grating in a direction parallel to the direction of the rulings of said secondary image of the first grating to blur any distinction in reflectivity of the surface while preserving the secondary image perpendicular to the direction of the rulings; and detector means, responsive to the fringe pattern formed after said secondary image passes through said second grating, for detecting displacement of said surface in a direction normal to the surface.

13. The system of claim 12 in which said detector means is a CCD camera for detecting shifts of the fringes of said moire fringe pattern.

14. The system of claim 12 in which said detector means includes a least two sets of photosensors, each sensor of one set aligned with a dark fringe of said moire fringe pattern, and each sensor of the second set aligned with a bright fringe of said moire fringe pattern for detecting shifts of the fringes of said moire fringe pattern.

15. The system of claim 12 in which said anamorphic means includes a first cylindrical lens orientated with its cylindrical axis perpendicular to the direction of the rulings of the secondary image.

16. The system of claim 15 in which said first cylindrical lens is positioned in an optical path between said surface and said second grating.

17. The system of claim 15 further including a second cylindrical lens positioned in an optical path behind said second grating for concentrating more light onto said detector means for increased sensitivity.

18. The system of claim 17 in which said second cylindrical lens is oriented with its cylindrical axis perpendicular to the direction of the fringes of said fringe pattern.

19. The system of claim 12 in which said first and second gratings are integral.

* * * * *